United States Patent
Hu et al.

(10) Patent No.: US 8,687,604 B2
(45) Date of Patent: Apr. 1, 2014

(54) METHOD AND APPARATUS FOR IMPROVED CELL ACQUISITION WITH REDUCED FREQUENCY ERROR IMPACT

(75) Inventors: An-Swol Clement Hu, Belmont, CA (US); Jittra Jootar, Los Angeles, CA (US); Parvathanathan Subrahmanya, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1001 days.

(21) Appl. No.: 12/404,203

(22) Filed: Mar. 13, 2009

(65) Prior Publication Data
US 2010/0232397 A1   Sep. 16, 2010

(51) Int. Cl.
*H04J 3/00* (2006.01)

(52) U.S. Cl.
USPC .......................................................... 370/336

(58) Field of Classification Search
USPC .......................................... 370/336, 331, 328
See application file for complete search history.

(56) References Cited

U.S. PATENT DOCUMENTS

| | | | |
|---|---|---|---|
| 6,744,747 B2 | 6/2004 | Shiu et al. | |
| 7,016,695 B1 * | 3/2006 | Bahai | 455/466 |
| 7,336,600 B2 * | 2/2008 | Feng et al. | 370/208 |
| 7,668,273 B2 * | 2/2010 | Paul et al. | 375/354 |
| 2004/0022273 A1 | 2/2004 | Jo et al. | |
| 2004/0161020 A1 * | 8/2004 | Mathew et al. | 375/149 |
| 2007/0177535 A1 * | 8/2007 | Zalio | 370/328 |
| 2009/0034482 A1 * | 2/2009 | Hahm et al. | 370/335 |
| 2009/0191891 A1 * | 7/2009 | Ma et al. | 455/456.1 |

FOREIGN PATENT DOCUMENTS

| | | |
|---|---|---|
| EP | 1748571 | 1/2007 |
| EP | 1843479 | 10/2007 |

OTHER PUBLICATIONS

International Search Report and Written Opinion—PCT/US2010/027347, International Search Authority—European Patent Office—Jul. 30, 2010.

\* cited by examiner

*Primary Examiner* — Mark Rinehart
*Assistant Examiner* — Mohammad Anwar (57) ABSTRACT

A method and apparatus for improved initial cell acquisition with reduced frequency error impact. The method determines the slot timing of a transmission, identifies the primary scrambling code and frame timing using the common pilot channel, and provides a path profile using a pseudorandom noise (PN) search. An apparatus using a cell searcher that performs the method is also described.

17 Claims, 8 Drawing Sheets

METHOD AND APPARATUS FOR IMPROVED CELL ACQUISITION WITH REDUCED FREQUENCY ERROR IMPACT

BACKGROUND

1. Field

The present invention relates generally to communications, and more specifically to a novel and improved cell acquisition process that reduces the impact of frequency error.

2. Background

Wireless communication systems are widely deployed to provide various types of communication such as voice, data, and so on. These systems may be based on code division multiple access (CDMA), time division multiple access (TDMA), or some other multiple access techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the Wideband Code Division Multiple Access (W-CDMA) standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

Pseudorandom noise (PN) sequences are commonly used in CDMA systems for spreading transmitted data, including transmitted pilot signals. The time required to transmit a single value of the PN sequence is known as a chip, and the rate at which the chips vary is known as the chip rate. CDMA receivers commonly employ RAKE receivers. A rake receiver is typically made up of one or more searchers for locating direct and multipath pilots from one or more base stations, and one or more multipath demodulators (fingers) for receiving and combining information signals from those base stations. A base station and its coverage are often collectively referred to as a "cell."

Inherent in the design of direct sequence CDMA systems is the requirement that a receiver must align its PN sequences to those of a base station. For example, in IS-95, each base station and subscriber unit uses the exact same PN sequences. A base station distinguishes itself from other base stations by inserting a unique time offset in the generation of its PN sequences (all base stations are offset by an integer multiple of 64 chips). A subscriber unit communicates with a base station by assigning at least one finger to that base station. An assigned finger must insert the appropriate offset into its PN sequence in order to communicate with that base station. An IS-95 receiver uses one or more searchers to locate the offsets of pilot signals, and hence to use those offsets in assigning fingers for receiving. Since IS-95 systems use a single set of in-phase (I) and quadrature (Q) PN sequences, one method of pilot location is to simply search the entire PN space by correlating an internally generated PN sequence with different offset hypotheses until one or more pilot signals are located.

Other systems, such as W-CDMA systems, differentiate base stations using a unique PN code for each, known as a primary scrambling code. The W-CDMA standard defines two Gold code sequences for scrambling the downlink, one for the in-phase component (I) and another for the quadrature (Q). The I and Q PN sequences together are broadcast throughout the cell without data modulation. This broadcast is referred to as the common pilot channel (CPICH). The PN sequences generated are truncated to a length of 38,400 chips. The period of 38,400 chips is referred to as a radio frame. Each radio frame is divided into 15 equal sections referred to as slots.

The first step taken by a radio communication device such as a mobile radio unit when commencing communications in a CDMA system is to identify the transmitting base stations or cells in terms of their primary scrambling code and the corresponding frame timing. Prior to commencing communications with a base station, the mobile unit has to synchronize itself with the timing reference of a base station. This process is commonly referred to as cell search. Once the primary scrambling code and frame timing of the target cell has been identified, the mobile unit sets up signaling and user (voice or data) channels to communicate with the base station.

It is possible to search for W-CDMA base stations in the manner described for IS-95 systems, described above. That is, the entire PN space can be searched offset by offset (38,400 of them) for each of the 512 primary codes. However, this is not practical due to the excessive amount of time such a search would require. Instead, the W-CDMA standard calls for base stations to transmit two additional synchronization channels, the primary and secondary synchronization channels, to assist the subscriber unit in searching efficiently.

As a result, W-CDMA search can be performed in three main steps, as follows:

Step 1. Slot synchronization: During this first stage of the cell search procedure, the mobile unit uses the Primary Synchronization Channel's (P-SCH) Primary Synchronization Code (PSC) to acquire slot (e.g., slots occur in 666 µs time intervals) synchronization to a cell as shown in step 102 of FIG. 1. The PSC is a 256-chip length code transmitted during the first 256 chips of each 2,560-chip slot, and all cells transmit the same PSC. The PSC is useful for detecting the presence of a base station or cell, and once it is acquired, slot timing is also acquired. The process involves correlating time shifted versions of the PSC with the incoming signal and detecting peaks. FIG. 2 shows one possible framing structure for the downlink in W-CDMA. This framing structure is used for a downlink dedicated physical channel (DPCH), which carries user-specific data for a terminal. The timeline for data transmission is divided into radio frames. Each radio frame is identified by a 12-bit system frame number (SFN) that is transmitted on a control channel. The SFN is reset to zero at a specific time, is incremented by one for each radio frame thereafter, and wraps around to zero after reaching the maximum value of 4095.

Each radio frame has a duration of 10 milliseconds (ms) and is further partitioned into 15 slots, which are labeled as slot 0 through slot 14. Each slot includes two data fields (Data1 and Data2) used to send user-specific data, a transmit power control (TPC) field used to send power control information, a transport format combination indicator (TFCI) field used to send format information (e.g., bit rate, channelization code, and so on), and a pilot field used to send a pilot.

Step 2. Frame synchronization and code-group identification: During the second step of the cell search procedure as shown in step 104 of FIG. 1, the mobile unit uses the secondary synchronization code (SSC) on the secondary synchronization channel (S-SCH) to find frame synchronization and identify the code group of the cell found in the first step. All primary scrambling codes used in W-CDMA systems are divided into groups of eight, and the code group is encoded into a sequence of SSCs. Correlating the received signal with all possible SSC sequences, and identifying the maximum correlation value accomplishes this. Since the cyclic shifts of the sequences are unique, the code group as well as the frame synchronization is determined.

Step 3. Scrambling code identification: During the third and final step of the cell search procedure as shown in step 106 of FIG. 1, the mobile unit determines the exact primary scrambling code used by the cell it has found. The primary scrambling code is typically identified through correlation over the common pilot channel (CPICH) with all eight codes within the code group identified in the second step, in a window around the frame timing provided in Step 2.

Steps 2 and 3 are performed until the correct scrambling code is identified, upon which the cell is acquired.

Frequency error affects acquisition performance in a CDMA system. Like the PSC, the SSC is available the first 256 chips of each 2,560-chip slot. Since at least 15 slots (i.e., 1 frame) and usually about 45 slots (i.e., 3 frames) are required to identify a code group in Step 2, a large number of samples must be taken. Every time a sample is taken, frequency error will lead to phase error and sampling time error, which accumulates over the entire search duration. Thus, over time, a given frequency error will cause both the phase error and the error in sampling time to accumulate. The error accumulation may, for example, cause the peak position to drift, thus impacting search performance. Reducing the number of samples taken will lead to reducing the accumulated phase and timing errors.

The benefits of reduced phase and sampling time errors are clear, and some issues associated with searching in asynchronous systems, such as W-CDMA, have just been highlighted, including initial cell acquisition. There is therefore a need in the art for improved search techniques for asynchronous systems, including initial cell acquisition.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one or more aspects, methods and apparatuses are provided that operate to acquire a cell based on a transmission.

In one aspect, a method for cell acquisition based on a transmission comprises the steps of determining a slot timing of the transmission, identifying a frame timing and a primary scrambling code of the transmission based on the determined slot timing, using a common pilot channel (CPICH), and providing a path profile based on the identified frame timing.

In one aspect, at least one processor configured to acquire a cell based on a transmission, comprises a first module for determining a slot timing of the transmission, a second module for identifying a frame timing and a primary scrambling code of the transmission based on the determined slot timing, using a common pilot channel (CPICH), and a third module for providing a path profile based on the identified frame timing.

In one aspect, a computer program product comprises a computer-readable medium comprising a first set of codes for causing a computer to determine a slot timing of a transmission, a second set of codes for causing the computer to identify a frame timing and a primary scrambling code of the transmission based on the determined slot timing, using a common pilot channel (CPICH), and a third set of codes for causing the computer to provide a path profile based on the identified frame timing.

In one aspect, an apparatus comprises means for determining a slot timing of a transmission, means for identifying frame timing and a primary scrambling code of the transmission based on the determined slot timing, using a common pilot channel (CPICH), and means for providing a path profile based on the identified frame timing.

In one aspect, an apparatus comprises a slot timing determiner, an identifier for identifying a primary scrambling code and a frame timing using a CPICH, and a path profile determiner for providing a path profile.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Figure 3:
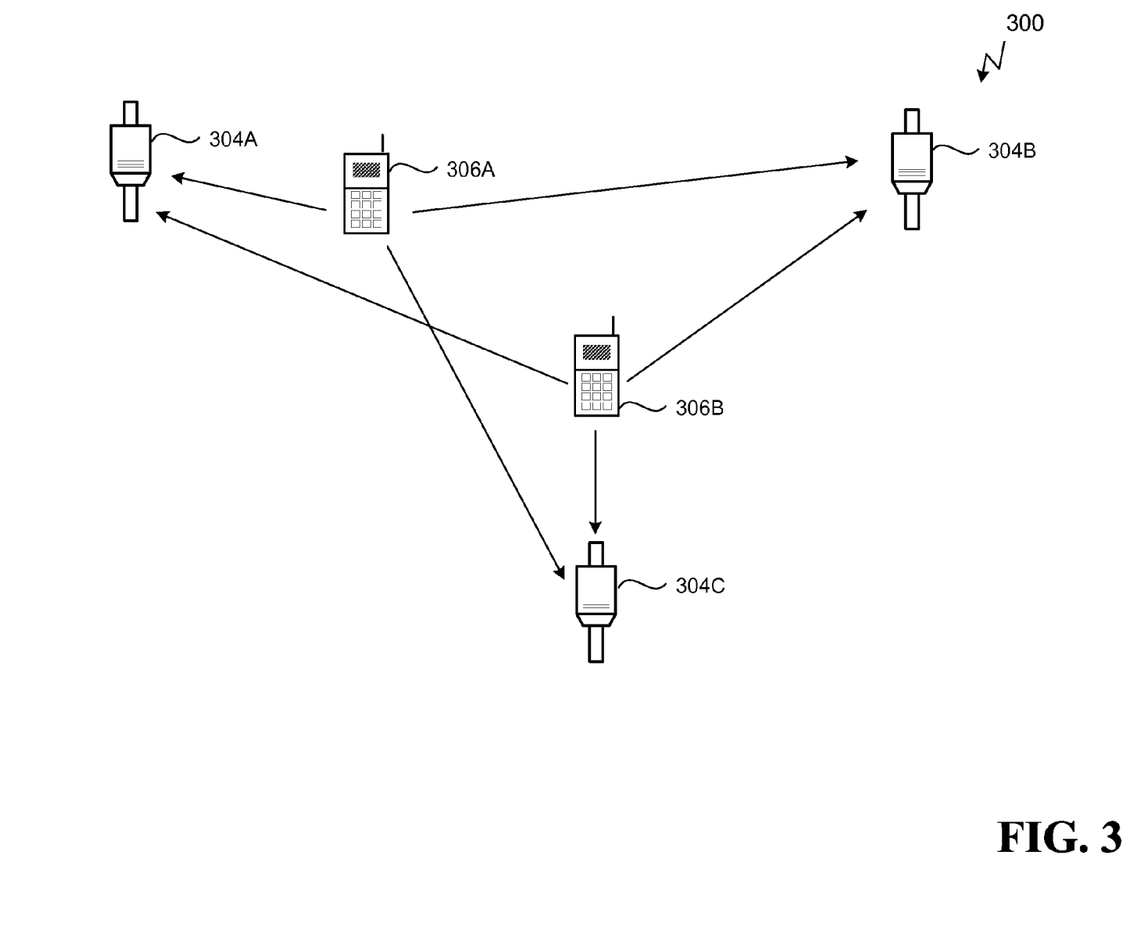
FIG. 3 is a general block diagram of a wireless communication system capable of supporting a number of users in accordance with various aspects.

FIG. 3 is a diagram of a wireless communication system 300 that supports a number of users, and which can implement various aspects of the invention. System 300 may be designed to support one or more CDMA standards and/or designs (e.g., the W-CDMA standard, the IS-95 standard, the cdma2000 standard, the HDR specification). For simplicity, system 300 is shown to include three base stations 304 in communication with two subscriber units 306. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the term access point. The term subscriber unit can be used interchangeably with the terms user equipment (UE), mobile station, subscriber station, access terminal, remote terminal, or other corresponding terms known in the art. The term mobile station encompasses fixed wireless applications.

Depending on the CDMA system being implemented, each subscriber unit 306 may communicate with one (or possibly more) base stations 304 on the forward link at any given moment, and may communicate with one or more base stations on the reverse link depending on whether or not the subscriber unit is in soft handoff. The forward link (i.e., downlink) refers to transmission from the base station to the subscriber unit, and the reverse link (i.e., uplink) refers to transmission from the subscriber unit to the base station.

For clarity, the examples used in describing this invention will assume base stations as the originator of signals and subscriber units as receivers and acquirers of those signals, i.e. signals on the forward link. Those skilled in the art will understand that subscriber units as well as base stations can be equipped to transmit data as described herein and the aspects of the present invention apply in those situations as well.

Figure 4A:
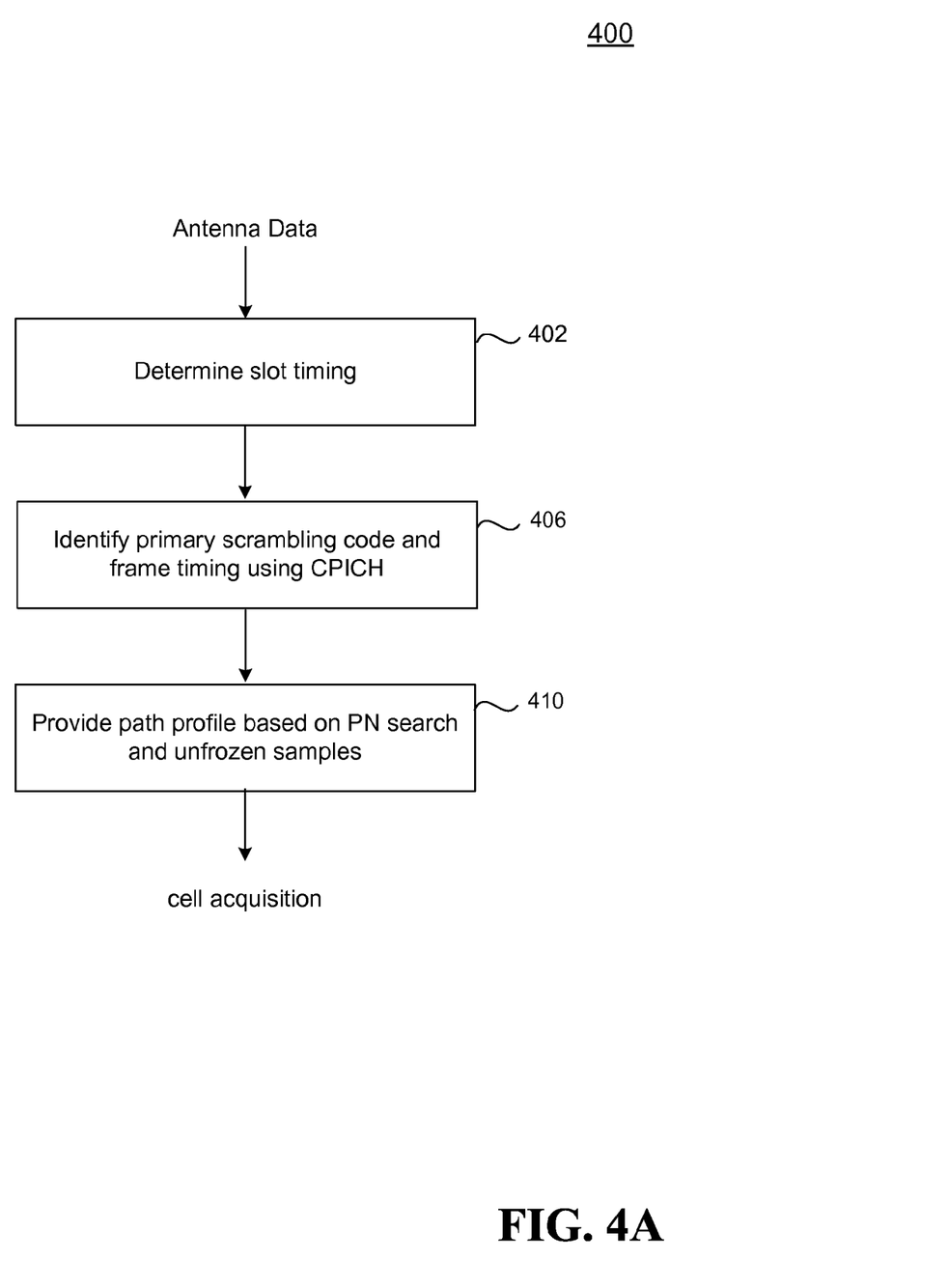
FIGS. 4A-4B present exemplary flow charts of functions performed in accordance with various aspects.

Referring now to FIG. 4A, therein shown is an exemplary flow chart 400 of functions performed in accordance with various aspects. In step 402, the slot timing is determined in a similar manner as described above in reference to FIG. 1. At step 406, the primary scrambling code and frame timing are identified using the common pilot channel (CPICH) by searching over 512 primary scrambling codes and 15 possible frame timing hypotheses based on the slot timing determined in step 402.

In one aspect, a PN search is performed at step 410 to provide a path profile. The PN search, in accordance with one aspect, is a correlation with the CPICH starting at different offsets inside a window surrounding the frame timing identified at step 406 to provide the path profile.

Step 406, referred to as a New Additional Step Two cum Three (NAS-TT) search, may be used to replace Steps 2 and 3 of the traditional process described above in reference to FIG. 1. The use of NAS-TT search 406 to replace Steps 2 and 3 of the traditional process for cell acquisition may significantly improve search performance because the phase and timing error accumulation during traditional Step 2 is much higher, due to the fact that Step 2 is performed by searching the S-SCH, as opposed to the CPICH. In accordance with one aspect, the use of NAS-TT search significantly improves search performance, as opposed to the use of Steps 2 and 3, because: (1) with enough hardware (e.g., processing capability) NAS-TT search takes a shorter amount of time; and (2) the CPICH generally has higher power than the S-SCH.

Figure 4B:
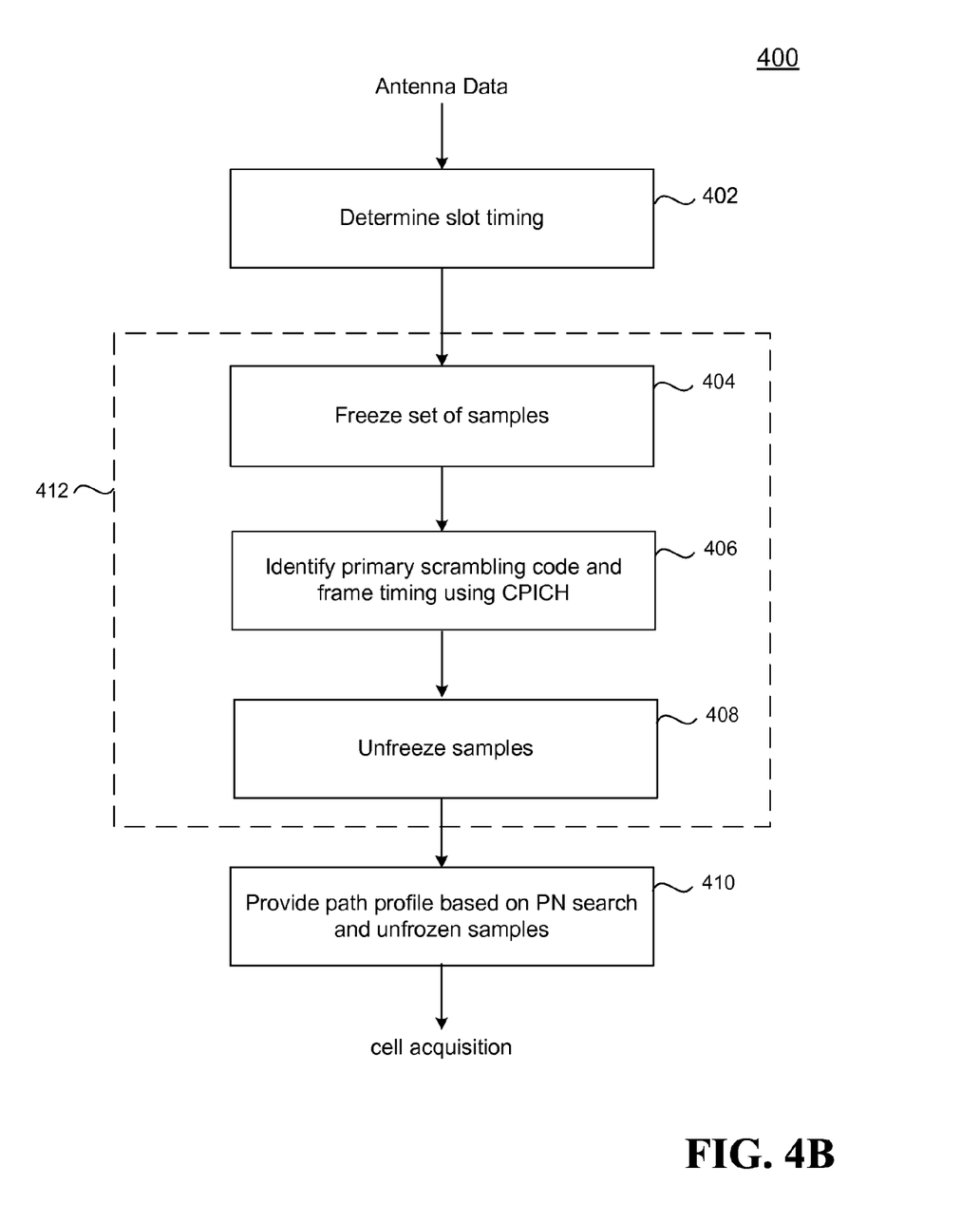

The NAS-TT search 406 may be used as described above, or may be used in combination with sample freezing, as shown in FIG. 4B. If sample freezing is used in combination with the NAS-TT search, the search may be completed in two slots. In accordance with one aspect, sample freezing permits limiting the search to the frozen samples (e.g., two slots), regardless of how much time is actually necessary to complete the NAS-TT search. At step 404, a fixed set of samples is frozen, such that it provides a snapshot of the signal, for example. At step 406, the primary scrambling code and frame timing are identified at step 406 by performing a NAS-TT search, as described above in reference to FIG. 4A.

Figure 1:
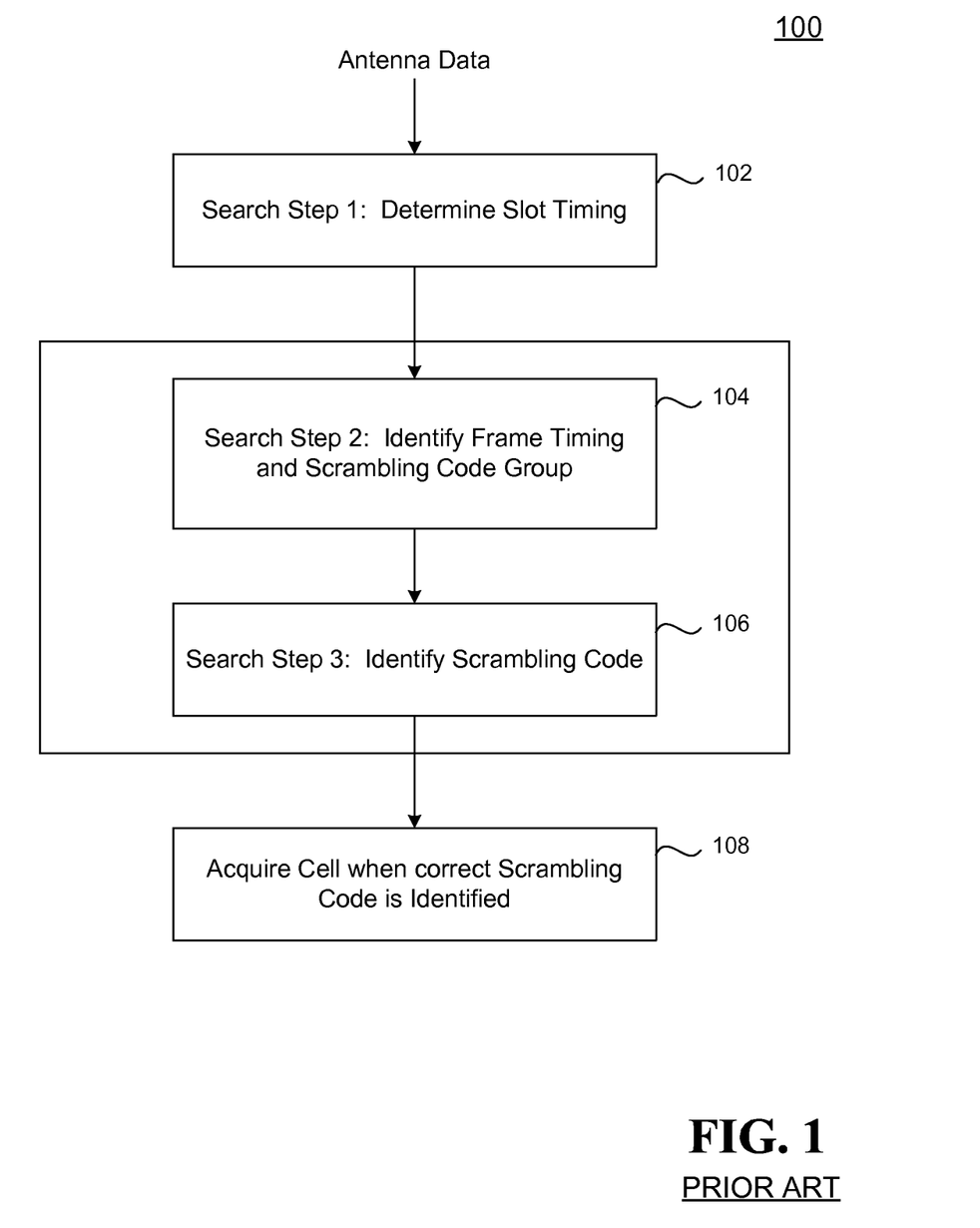
FIG. 1 is a flow chart of steps performed in a prior art cell acquisition procedure.
Figure 2:
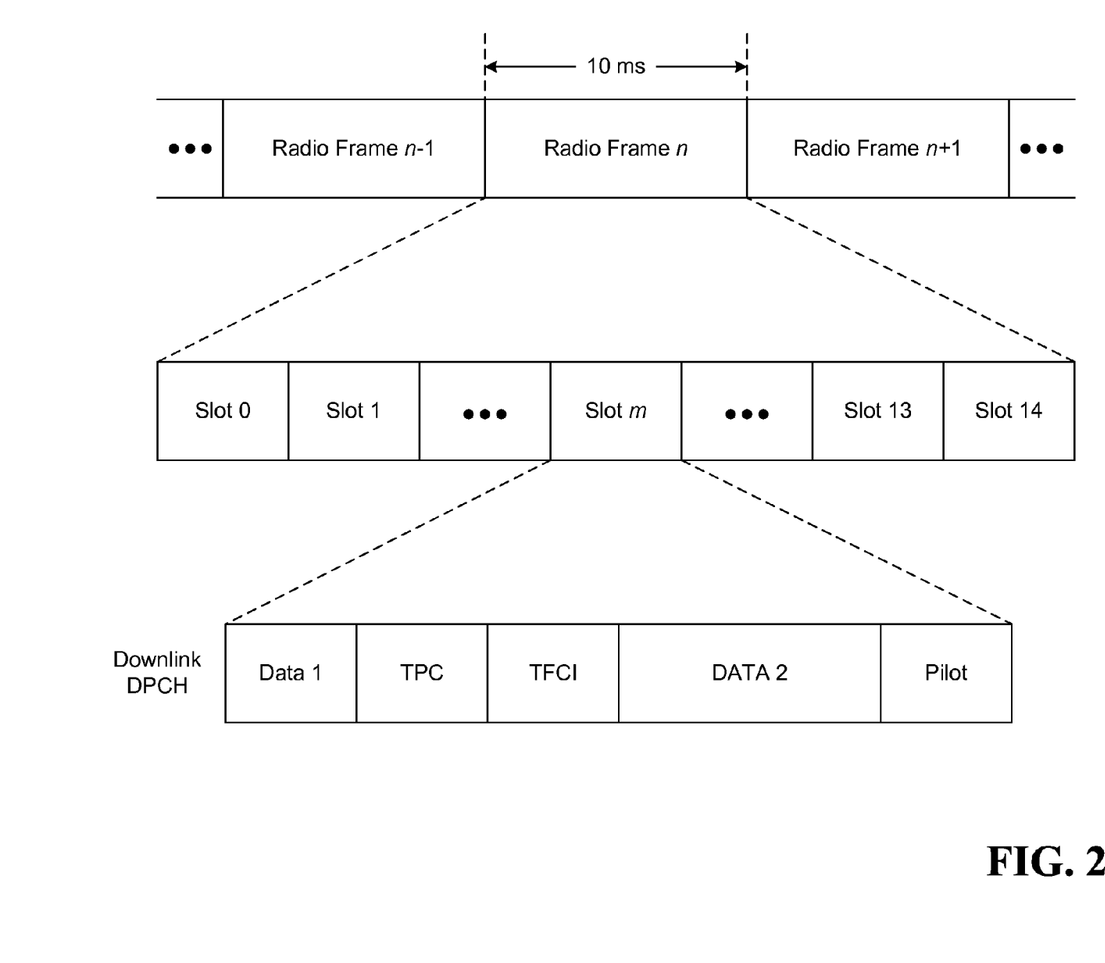
FIG. 2 shows a framing structure for the downlink in W-CDMA.

In accordance with one aspect, because the CPICH is transmitted continuously, as opposed to the SSC (which is transmitted during the first 256 chips of each 2,560-chip slot, as described in reference to FIG. 1, above) it is possible to use a much more limited number of samples (e.g., about two slots) to identify the primary scrambling code and frame timing. As a result, only the phase and timing error accumulation over the frozen samples (e.g., about two slots) may affect the search results.

A PN search may be performed at step 410 to provide a path profile, as described above in reference to FIG. 4A. Since it is desired to obtain the path profile on the current (e.g., real-time) samples, in accordance with one aspect, the frozen samples may be unfrozen at step 408 before executing the PN search at step 410. The peak position found from the PN search on current samples may be different from the timing acquired using the earlier frozen samples, due to the effects of phase and timing error accumulation. However, this peak position movement is covered by the large PN search window.

As outlined in more detail in reference to FIG. 1, above, a Step 2 search requires at least one and usually three frames (i.e., 15-45 slots), which causes a significantly larger error accumulation over the entire search duration, when compared with the NAS-TT search.

While the NAS-TT search described above (with or without sample freezing) is in accordance with some aspects, it will be recognized by those of ordinary skill in the art that any search that is performed over a shorter duration than the traditional Step 2 search, will achieve the goal of improving search performance by decreasing the accumulated phase and timing error. The use of frozen samples (e.g., two slots) limits the search to the number of slots that are frozen.

Figure 5:
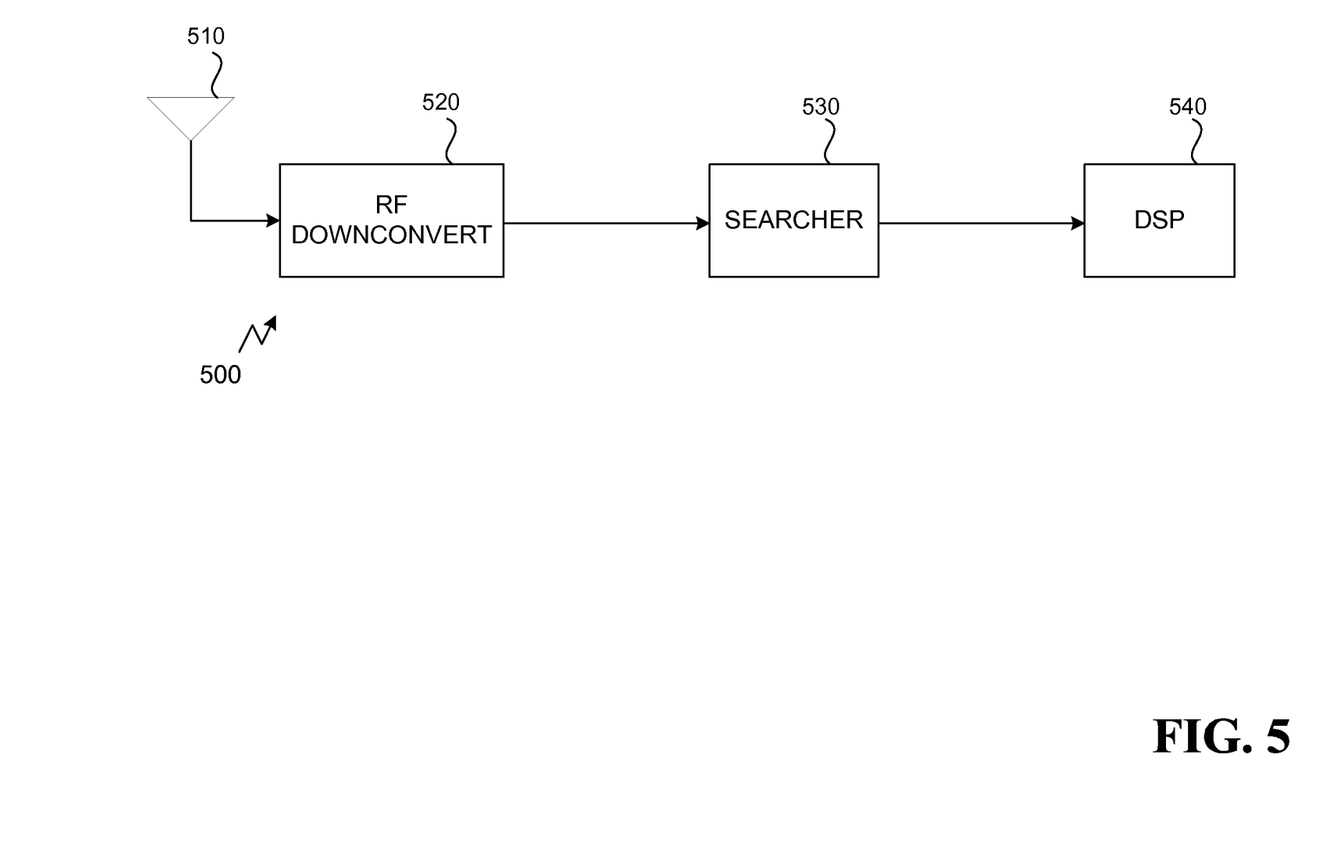
FIG. 5 depicts an exemplary subscriber unit configured in accordance with various aspects.

FIG. 5 shows an exemplary subscriber unit 500, configured for use with various aspects. Only a subset of the components of a subscriber unit are shown. Signals are received at antenna 510, and delivered to RF downconvert block 520 for amplification, downconversion, and sampling. Various techniques for downconverting CDMA signals to baseband are known in the art. From RF downconvert block 520, I and Q samples are delivered to searcher 530. Searcher 530 is in communication with a digital signal processor (DSP) 540. Alternatives to employing a DSP include using another type of general purpose processor, or specialized hardware designed to carry out various tasks related to searching that might be employed in the DSP. Depending on the capabilities of searcher 530, DSP 540 will carry out various tasks described in the methods above, and coordinate the performance of the remaining tasks in searcher 530. While only one searcher 530 is shown in FIG. 5, any number of searchers can be implemented in parallel in accordance with principles of the present invention. Searcher 530 will ultimately deliver energy values corresponding to offsets to DSP 540. The offsets may be delivered as sorted, detected peaks, if the capability exists in Searcher 530. Or, raw energy values may be delivered for further processing in the DSP.

Figure 6:
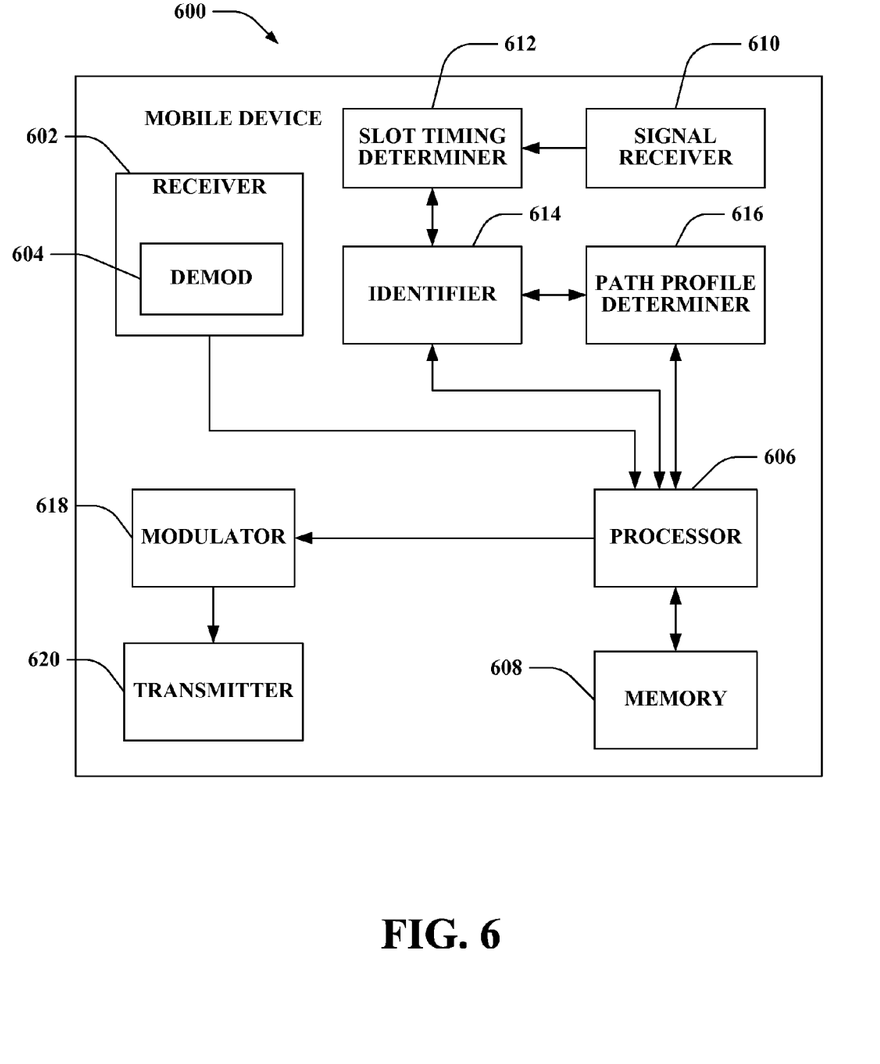
FIG. 6 is an illustration of an example mobile device that facilitates initial cell acquisition and processing of signaling in a wireless network, in accordance with various aspects.

FIG. 6 is an illustration of a mobile device 600 that facilitates initial acquisition and further processing of signaling received over a wireless network, in accordance with various aspects. Mobile device 600 comprises a receiver 602 that receives a signal from, for instance, a receiver antenna (not shown), performs typical actions on (e.g., initial acquisition of a cell, filtering, amplification, downconversion, etc.) the received signal, and digitizes the conditioned signal to obtain samples. Receiver 602 can comprise a demodulator 604 that can demodulate received symbols and provide them to a processor 606 for channel estimation. Processor 606 can be a processor dedicated to analyzing information received by receiver 602 and/or generating information for transmission by a transmitter 620, a processor that controls one or more components of mobile device 600, and/or a processor that both analyzes information received by receiver 602, generates information for transmission by transmitter 620, and controls one or more components of mobile device 600.

Mobile device 600 can additionally comprise memory 608 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. Memory 608 can additionally store protocols and/or algorithms associated with estimating and/or utilizing a channel (e.g., performance based, capacity based, etc.).

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Mobile device 600 can further comprise a receiver 610 that can receive signaling over a wireless network. The receiver 610 can be further coupled to a slot timing determiner 612, in which the mobile unit uses PSC to acquire slot synchronization to a cell, as described in more detail above. In addition, the slot timing determiner 612 can be coupled to an identifier 614 that can identify the primary scrambling code and frame timing of the signal using the CPICH. Further, the slot timing determiner 612 can be coupled to a path profile determiner 616 for determining the path profile, for example, via a PN search over a window surrounding the frame timing identified by identifier 614.

In one example, as described, upon acquiring slot synchronization by the slot timing determiner 612, a fixed set of samples may be frozen, such that it provides a snapshot of the signal, for example. Identifier 614 can identify the primary scrambling code and frame timing using the frozen set of samples by performing a NAS-TT search, as described above. The frozen samples may be unfrozen prior to the path profile determiner 616 executing the PN search to determine the path profile.

Mobile device 600 still further comprises a modulator 618 and transmitter 620 that respectively modulate and transmit signals to, for instance, a base station, another mobile device, etc. This can operate as part of a disparate bidirectional wireless network utilized to communicate non-broadcast information (such as content policy modifications, etc.) Although depicted as being separate from the processor 606, it is to be appreciated that the identifier 614, path profile determiner 616, demodulator 604, and/or modulator 618 can be part of the processor 606 or multiple processors (not shown).

Figure 7:
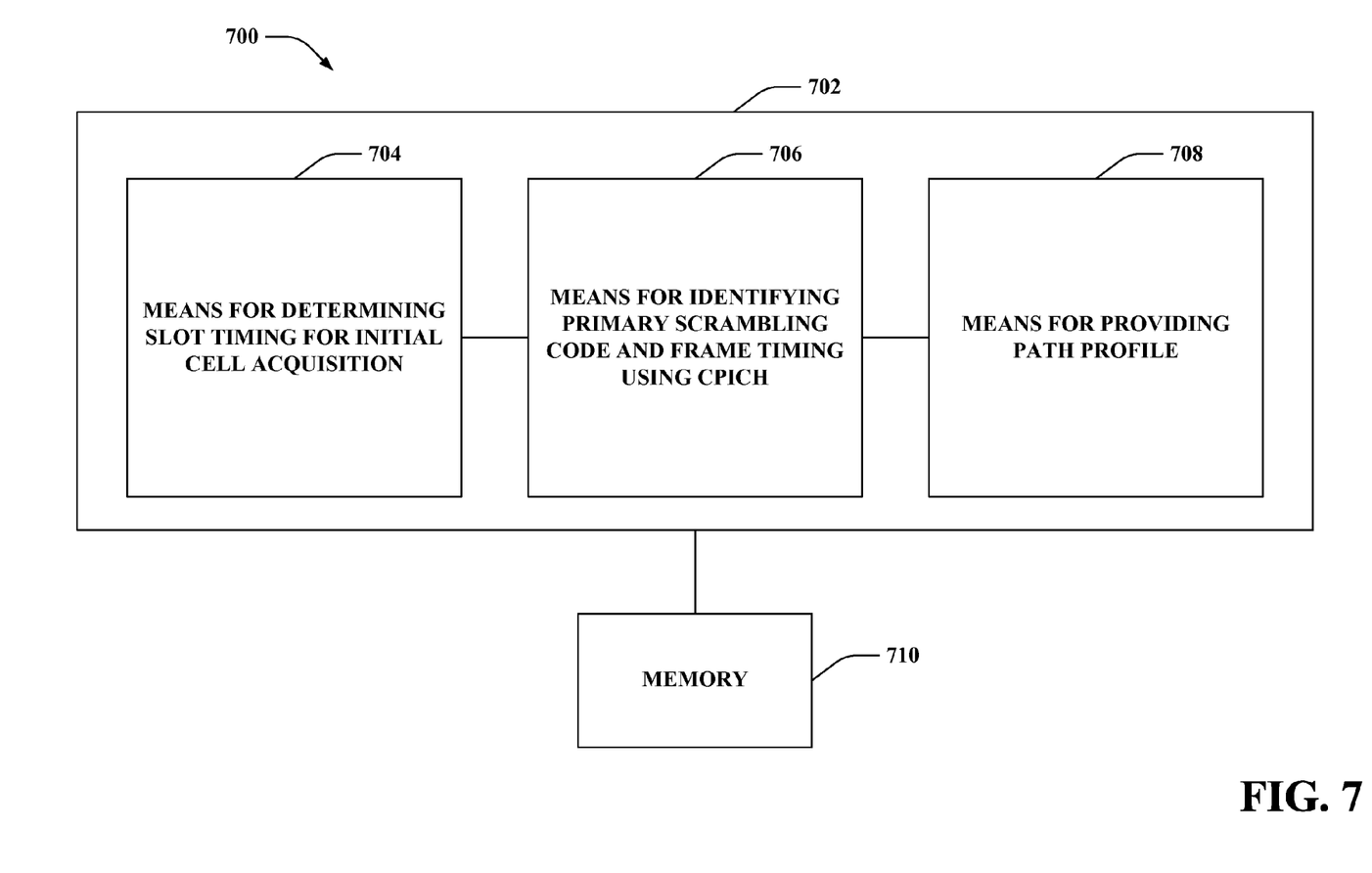
FIG. 7 is an illustration of an example system that facilitates initial cell acquisition and processing of signaling in a wireless network, in accordance with various aspects.

With reference to FIG. 7, therein illustrated is a system 700 that facilitates initial cell acquisition and processing of signaling in a wireless network, in accordance with various aspects.

System 700 can reside at least partially within a mobile device, for example. It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction.

For instance, logical grouping 702 can include means for determining slot timing for initial cell acquisition 704, which functions to acquire slot synchronization to a cell using the PSC. Further, logical grouping 702 can comprise means for identifying the primary scrambling code and frame timing using CPICH 706. For example, means 706 can identify the primary scrambling code and frame timing using a NAS-TT search. In addition, logical grouping 702 can comprise means for providing the path profile 708. Additionally, system 700 can include a memory 710 that retains instructions for executing functions associated with electrical components 704, 706, and 708. While shown as being external to memory 710, it is to be understood that one or more of electrical components 704, 706, and 708 can exist within memory 710.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blue-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for cell acquisition based on a transmission, comprising:
   determining a slot timing of the transmission;
   selecting and freezing a portion of transmitted slots as a set of samples;
   using the frozen set of samples and a common pilot channel (CPICH) to identify a frame timing and a primary scrambling code of the transmission based on the determined slot timing; and
   providing a path profile based on the identified frame timing.

2. The method according to claim 1, further comprising:
unfreezing the set of samples prior to providing a path profile.

3. The method according to claim 2, wherein the path profile is provided using the unfrozen set of samples.

4. The method according to claim 1, wherein the path profile is provided based upon a pseudorandom noise (PN) search.

5. The method according to claim 1, wherein the frame timing and the primary scrambling code are identified using a New Additional Step—Two cum Three (NAS-TT) search.

6. The method according to claim 1, wherein the path profile is used to acquire a cell.

7. The method according to claim 6, wherein the cell is acquired with a reduced frequency error impact.

8. A wireless communications apparatus, comprising:
at least one processor configured to:
determine a slot timing of the transmission;
select and freeze a portion of transmitted slots as a set of samples;
use the frozen set of samples and a common pilot channel (CPICH) to identify a frame timing and a primary scrambling code of the transmission based on the determined slot timing; and
provide a path profile based on the identified frame timing; and
a memory coupled to the at least one processor.

9. A computer program product, comprising:
a non-transitory computer-readable medium, comprising:
a first set of codes for causing a computer to determine a slot timing of a transmission;
a second set of codes for causing the computer to select and freeze a portion of transmitted slots as a set of samples;
a third set of codes for causing the computer to use the frozen set of samples and a common pilot channel (CPICH) to identify a frame timing and a primary scrambling code of the transmission based on the determined slot timing; and
a fourth set of codes for causing the computer to provide a path profile based on the identified frame timing.

10. An apparatus, comprising:
means for determining a slot timing of a transmission;
means for selecting and freezing a portion of transmitted slots as a set of samples;
means for using the frozen set of samples and a common pilot channel (CPICH) to identify a frame timing and a primary scrambling code of the transmission based on the determined slot timing; and
means for providing a path profile based on the identified frame timing.

11. An apparatus comprising:
a slot timing determiner for determining a slot timing of a transmission, wherein a portion of transmitted slots is selected and frozen as a set of samples;
an identifier for using the frozen set of samples and a common pilot channel (CPICH) to identify a frame timing and a primary scrambling code of the transmission based on the determined slot timing; and
a path profile determiner for providing a path profile based on the identified frame timing.

12. The apparatus according to claim 11, wherein the frozen set of samples is unfrozen prior to providing a path profile.

13. The apparatus according to claim 12, wherein the path profile is provided using the unfrozen set of samples.

14. The apparatus according to claim 11, wherein the path profile is provided based upon a pseudorandom noise (PN) search.

15. The apparatus according to claim 11, wherein the frame timing and the primary scrambling code are identified using a New Additional Step—Two cum Three (NAS-TT) search.

16. The apparatus according to claim 11, wherein the path profile is used to acquire a cell.

17. The apparatus according to claim 16, wherein the cell is acquired with a reduced frequency error impact.

* * * * *